United States Patent [19]
Cardini et al.

[11] Patent Number: 5,383,619
[45] Date of Patent: Jan. 24, 1995

[54] METHODS AND APPARATUS FOR WINDING ARMATURES WITH IMPROVED BALANCE

[75] Inventors: Giuseppe Cardini, Florence; Massimo Lombardi, Scandicci; Mauro Tarchi, Florence, all of Italy

[73] Assignee: Axis USA, Inc., Marlborough, Mass.

[21] Appl. No.: 42,607

[22] Filed: Apr. 2, 1993

[51] Int. Cl.6 .................................................. H02K 15/09
[52] U.S. Cl. ................................................. 242/7.05 B
[58] Field of Search ............... 242/1.1 R, 7.02, 7.03, 242/7.05 R, 7.05 A, 7.05 B, 7.05 C, 7.11; 29/596

[56] References Cited

U.S. PATENT DOCUMENTS

| | | | |
|---|---|---|---|
| 4,062,502 | 12/1977 | Peck, Jr. | 242/7.11 |
| 4,880,173 | 11/1989 | Lachey | 242/1.1 R |
| 5,029,619 | 7/1991 | Hongo et al. | 140/92.2 |
| 5,080,295 | 1/1992 | Hongo et al. | 242/7.05 R |
| 5,219,124 | 6/1993 | Shi et al. | 242/1.1 R |
| 5,251,833 | 10/1993 | Furuhashi et al. | 242/1.1 R |
| 5,310,124 | 5/1994 | Linari et al. | 242/7.05 B |

FOREIGN PATENT DOCUMENTS

0536981  4/1993  European Pat. Off. .

*Primary Examiner*—Katherine Matecki
*Attorney, Agent, or Firm*—Fish & Neave; Robert R. Jackson

[57] ABSTRACT

The balance of rotors for dynamo-electric machines (e.g., electric motor armatures), which are wound with two diametrically opposite, simultaneously applied coils of wire, is improved by ensuring that wire is fed to both coils in substantially similar quantities. This can be accomplished by monitoring the consumption of each wire as it is fed to its respective coil, and adjusting the tension with which at least one wire is fed to its coil to substantially equalize the wire consumptions. Alternatively, the tension at which both wires are fed to the coils is monitored, and the tension of at least one wire is adjusted to equalize the tension of the two wires.

9 Claims, 9 Drawing Sheets

METHODS AND APPARATUS FOR WINDING ARMATURES WITH IMPROVED BALANCE

BACKGROUND OF THE INVENTION

This invention relates to making armatures for dynamo-electric machines such as motors and generators. Although the invention will be described primarily in the context of its application to electric motor armatures, it will be appreciated that it is equally applicable to rotating rotors in general which are wound with wire for conducting electric current. For convenience, all such rotors are referred to herein as armatures. Also, although the invention will be described primarily in the context of flyer type armature coil winders, it will be understood that the invention is equally applicable to winders that employ other types of coil wire dispensing members such as the apparatus shown in commonly assigned, co-pending applications Ser. Nos. 07/738,199 and 07/742,629.

With reference to accompanying FIG. 1, finished armatures 10 wound with wire 12 in coil receiving slots 14 of a lamination stack 16 need to be precisely balanced prior to their final operational use. This avoids mechanical malfunctioning, and also guarantees the integrity of the armature, together with that of other components which are assembled in the environment where the final operational use occurs.

It is common practice to use automatic balancing machines at the end of an armature production line to determine the amount of unbalance produced during the processing stages and to correct for this unbalance by adding or removing masses on certain parts of the finished armature. The most common technique for automatic balancing of armatures removes masses by milling one or more grooves in the outer circumferential surface of the armature stack 16.

Unbalance (requiring balancing as described above) may be the result of unbalances present in the mass of stack 16, in the mass of shaft 18, in the mass of commutator 19, and also in the overall disposition of these masses as a result of the operations required to assemble them to form the armature. Unbalance of the armature can also result from the operational steps required to wind the coils of wire 12 in the slots 14 of stack 16. Although the disposition of the coils (and their number of turns) around the armature is theoretically correct for avoiding unbalance, practice has shown that the winding process can introduce unbalance.

In order to reduce the need for or the required extent of a final balancing step in the manufacture of armatures, it is an object of this invention to reduce or substantially eliminate unbalance which may otherwise result from the coil winding operation.

Formation of armature coils requires simultaneous winding of two wires in two pairs of slots which are symmetrically opposite one another as shown in accompanying FIG. 2. For example, coil 20 is wound in slot pair 22, 23 symmetrically opposite to coil 21 which is simultaneously wound in slot pair 24, 25.

One of the fundamental production specifications for winding armatures usually requires winding symmetrically opposite pairs of slots (such as those referenced above) with the same number of turns of wire. As has been mentioned, this creates a theoretical basis for avoiding unbalance, although, as will be more fully described below, in practice during winding various factors can cause unbalance.

Armatures of the type shown in accompanying FIG. 1 are frequently wound with a flyer type winder, although other types of winders (e.g., those shown in above-mentioned application Ser. Nos. 07/738,199 and 07/742,629 (both of which are incorporated by reference herein)) are also known and are subject to the same problems and solutions discussed herein. As shown in accompanying FIGS. 3 and 4, the typical flyer type winder includes two opposite flyers 30, 31 which can rotate around respective axes 32, 33 so that each of them dispenses an associated wire 34, 35 coming from a wire spool 36, 37 into a respective pair of coil receiving slots 38, 39 and 40, 41 aligned with prepositioned winding forms 42, 43. The winding forms are required to guide each wire into the coil receiving slots as the wire leaves the associated flyer. The wires required to wind the coils, prior to reaching the flyers from the wire spools, pass through respective tensioner devices 46, 47 which are supposed to guarantee that predetermined tensions are maintained on the wires during the various operations required to wind and form the leads of the armature. The two flyers 30 and 31 rotate at the same time so that each of them forms a coil in respective pairs of slots which are symmetrically disposed on opposite sides of a central transverse axis 80 of the armature. Flyers 30 and 31 are driven by independent motors 44, 45, which are controlled to rotate in unison so that both flyers reach, as precisely as possible, similar predetermined angular positions in time. In particular, the two flyers start and terminate rotation at the same time so that both coils are wound simultaneously with the same number of turns.

At any given instant of time during winding, a difference between the tension of the wires being wound by their respective flyers can result in different elongation of the wires. In a comparison between the two flyers, which are winding opposite coils at the same time, this leads to supplying in certain instances different masses of wire into symmetrically opposite pairs of slots of the armature (such as those shown in FIG. 4). This has an unbalancing effect on the armature. In addition, a coil wound with higher tension will have more compact turns, which influences the radial disposition of its mass (e.g., in relation to the central longitudinal axis 82 of the armature). This also contributes to unbalance if variations of this type exist between the opposite coils being formed at the same time by the two flyers.

The foregoing considerations can be further illustrated with the aid of accompanying FIG. 5, in which certain features are somewhat exaggerated. The wires relating to a few coil turns for respective opposite coils 20, 21 are shown. The turns of coil 21 are wound with higher tension, which subjects the wire to a greater amount of elongation for the same number of turns. This causes coil 21 to have less wire mass and to be more compact toward the central longitudinal axis 82 of the armature than coil 20. It should be appreciated that the formation of the overall coils of the armature requires a progressive build-up of wire turns and also of different coils. Later-wound turns and coils surmount earlier-wound turns and coils so that the later-wound material is farther away from central axis 82. As a result of this overlying or overlapping, the presence of an internal coil which is less compact tends to amplify the unbalance because it also affects the mass disposition of successive coils which will be positioned farther away from the central longitudinal axis 82 of the armature.

In view of the foregoing, it is an object of this invention to reduce or substantially eliminate the unbalance of an armature that may be due to the coils wound on the armature.

It is a more particular object of this invention to reduce or substantially eliminate the previously described differences which may exist between two coils wound simultaneously on an armature by two flyers or other wire depositing elements, so that unbalance introduced during the winding process of an armature can be reduced or substantially eliminated.

SUMMARY OF THE INVENTION

These and other objects of the invention are accomplished in accordance with a first embodiment of the invention by monitoring the consumption of each of the two wires being wound simultaneously on the armature. These consumptions of the two wires are compared, and if there is a difference, the tension of the wire having the greater consumption is increased relative to the tension of the other wire to restore substantial equality of the consumptions.

In an alternative embodiment of the invention the tension of each of the two wires travelling toward their respective wire dispensing members is measured. Whenever a difference in tension is detected, the tension of the wire having the lower tension is increased relative to the tension of the other wire to restore substantial equality of tension in the two wires.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
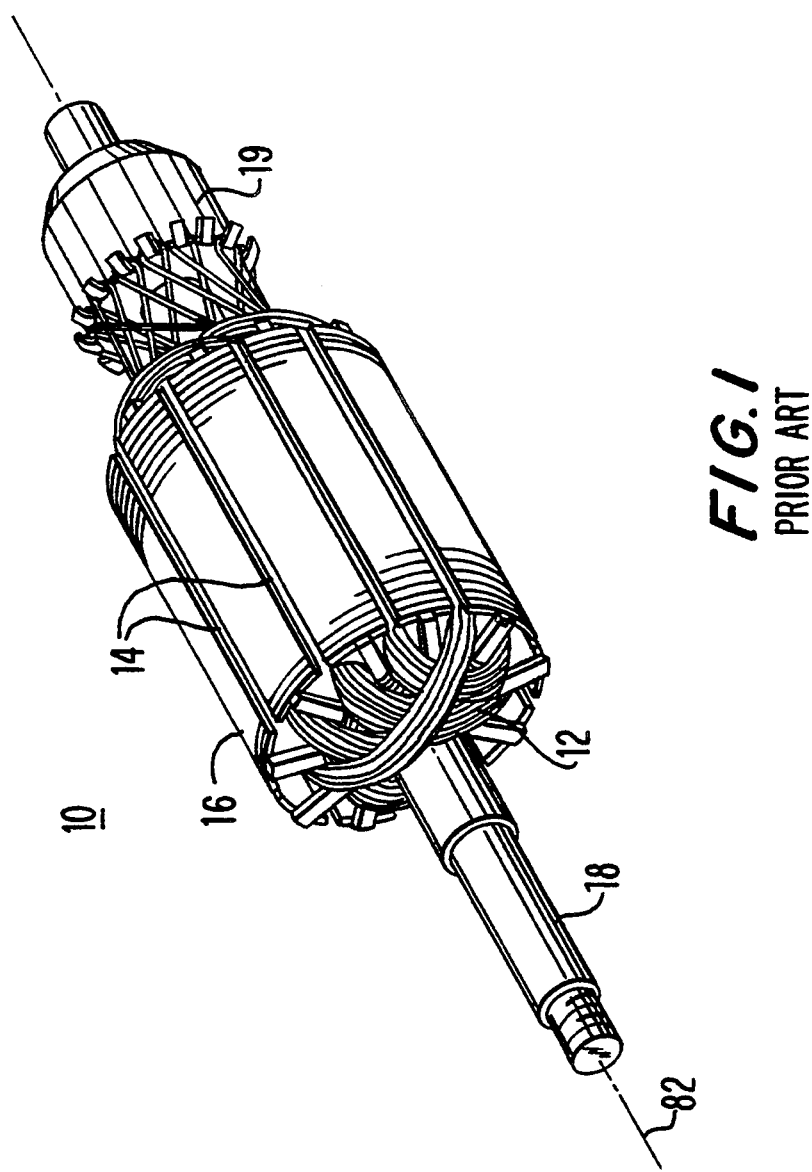
FIG. 1 is a perspective view of a conventional armature which can be wound in accordance with this invention.
Figure 2:
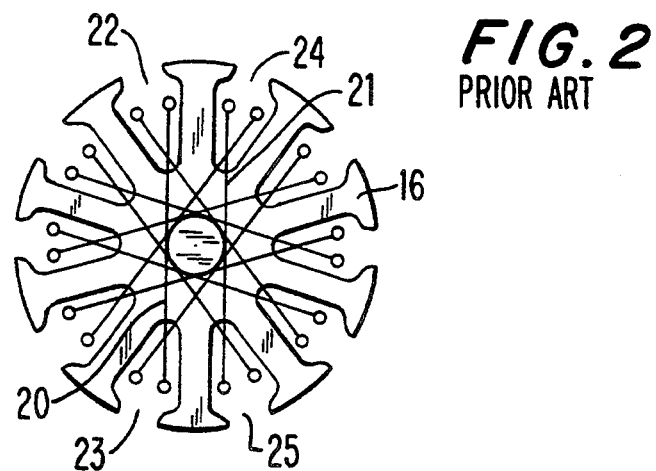
FIG. 2 is a simplified axial end view of the armature of FIG. 1 showing the dispositions of the core slots and the related coils.
Figure 4:
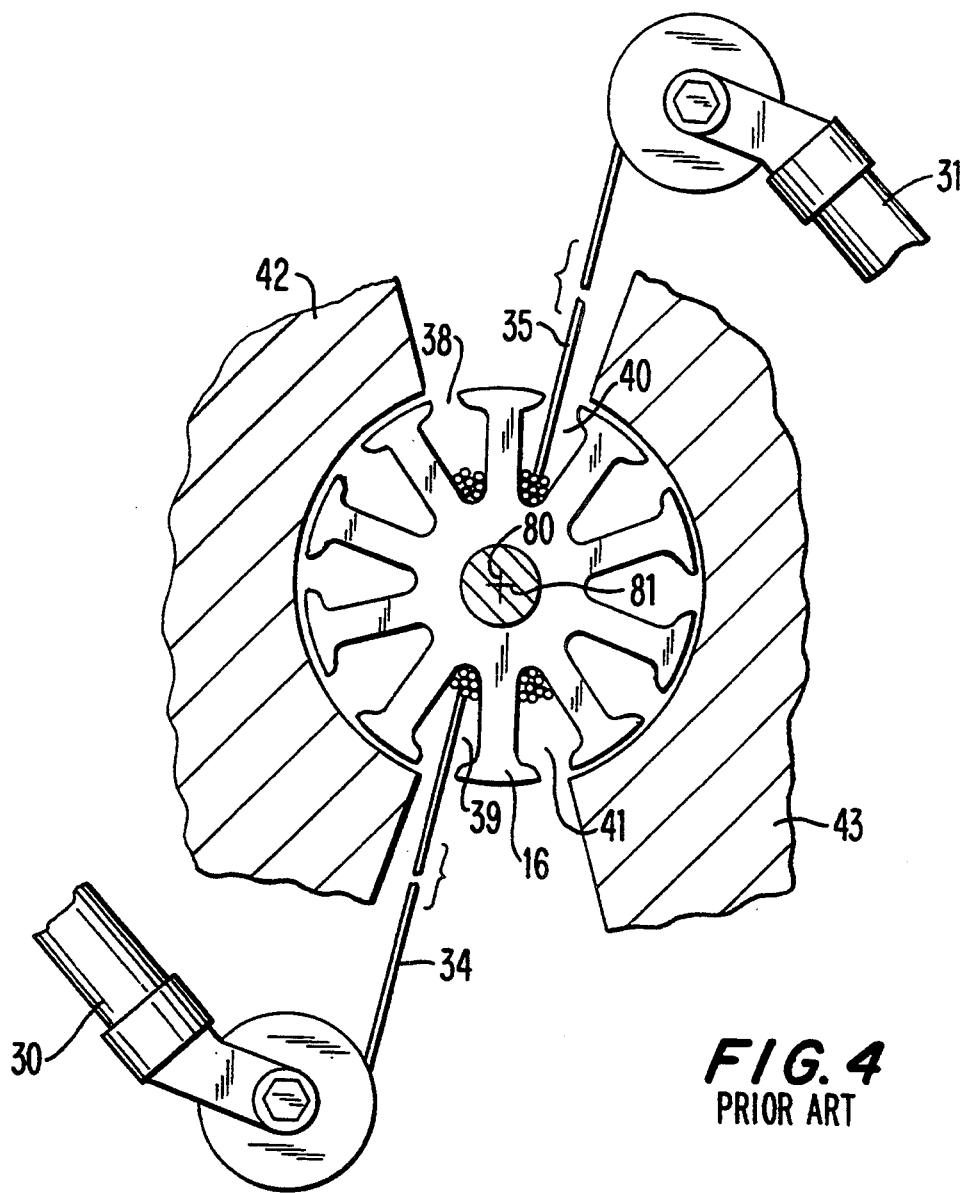
FIG. 4 is an enlarged view, partly in section, of the central portion of FIG. 3.
Figure 3:
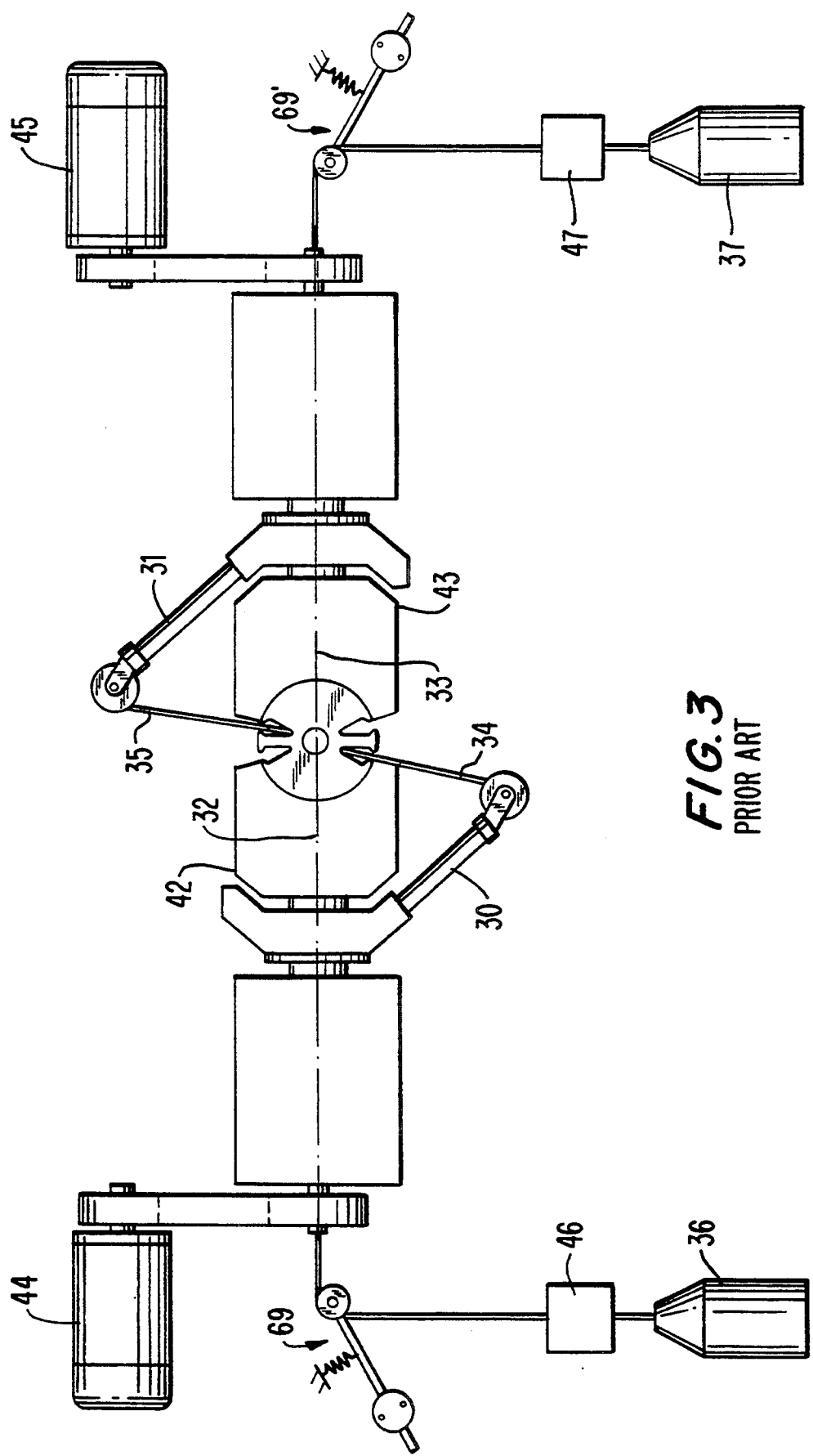
FIG. 3 is a simplified elevational view of a conventional two flyer winding machine.
Figure 5:
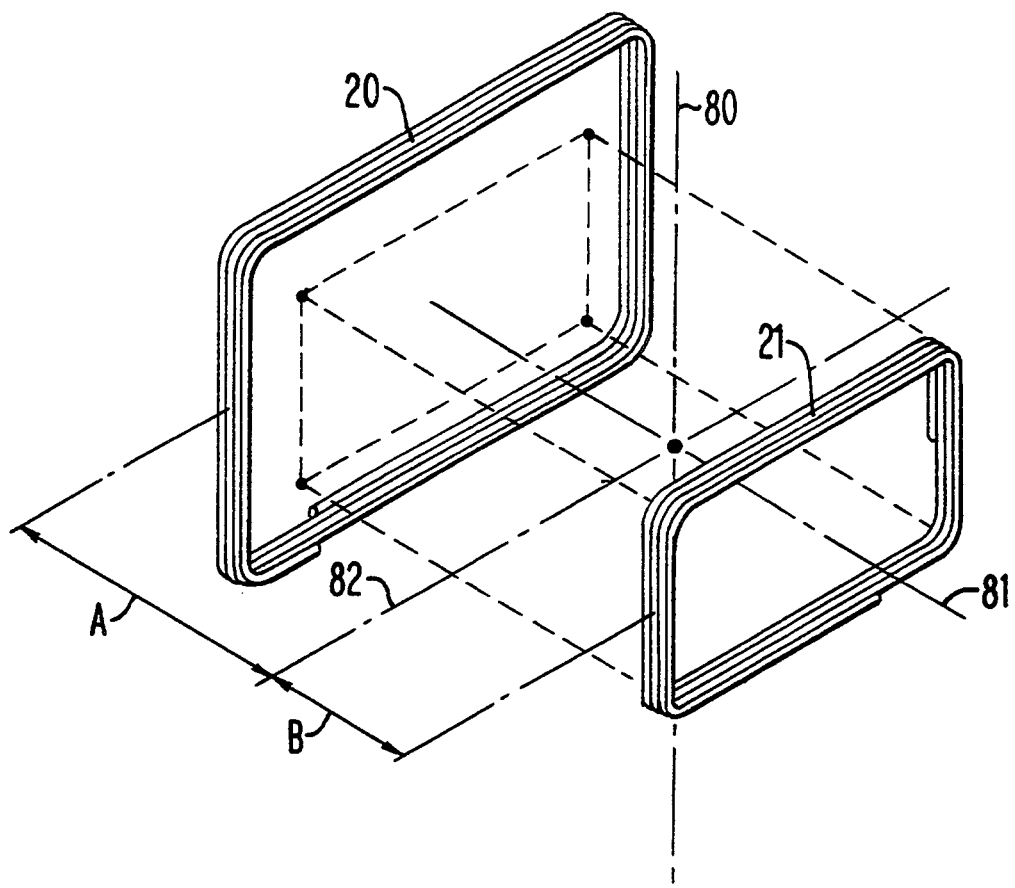
FIG. 5 is a simplified perspective view, with certain features somewhat exaggerated, showing coil turns relating to opposite receiving slots of the armature which may be produced simultaneously by conventional armature winding apparatus.
Figure 6:
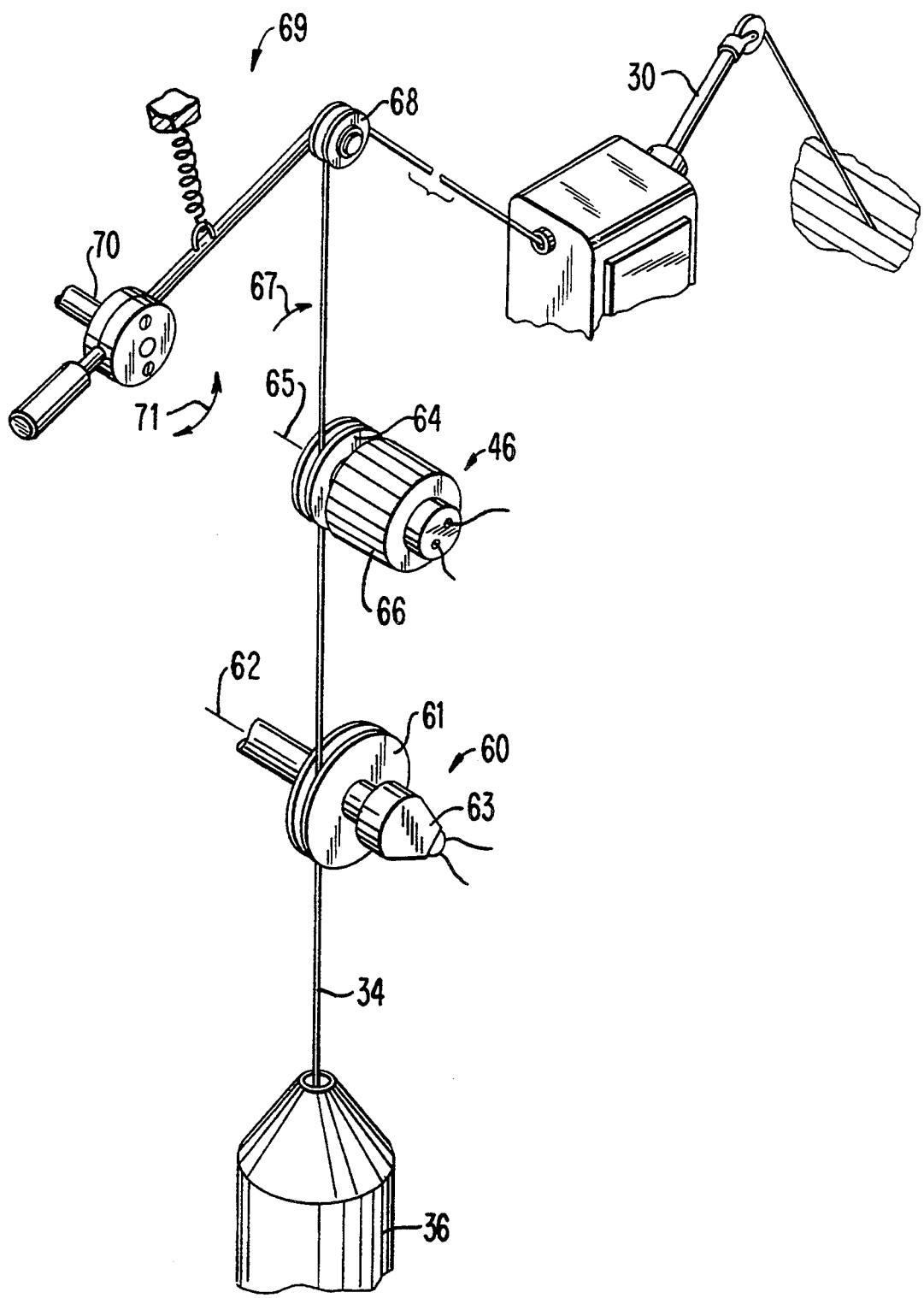
FIG. 6 is a simplified perspective view of a first illustrative embodiment of armature winding apparatus constructed in accordance with this invention.
Figure 7:
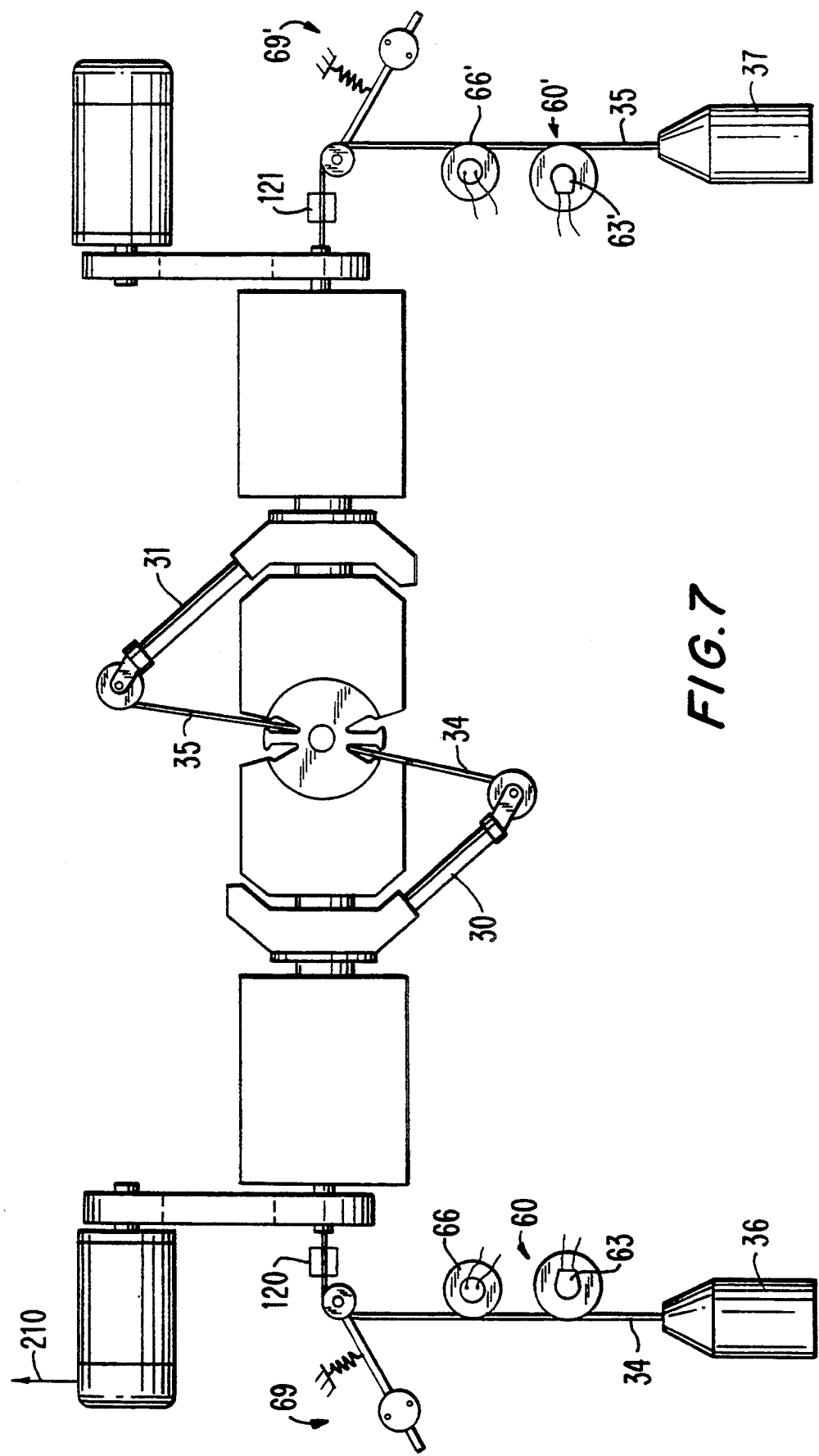
FIG. 7 is a simplified elevational view of a two flyer winder constructed as shown in FIG. 6.

FIGS. 6 and 7 show part of the equipment which can be used in accordance with a first embodiment of the invention on a two flyer armature winding machine to achieve the previously described objects of the invention. The initial description which follows with reference to FIG. 6 relates to the equipment required for one of the flyers, although it will be understood that similar equipment (shown in FIG. 7 and identified by the same reference numbering with prime notation) is provided for the second flyer of the machine.

With reference to the flyer numbered 30, reference number 36 indicates a spool required to supply wire 34 for winding. From spool 36, the wire leads to a pulley 61 of a wire consumption sensing device 60. Pulley 61 is mounted to rotate about axis 62 by mounting its central shaft on supports of the machine frame (not shown). The central shaft of pulley 61 is linked by means of a mechanical joint to the rotatable input of an encoder 63 so that the latter can supply output signals representative of the rotations that the pulley undergoes about axis 62. For example, encoder 63 may produce an output pulse each time pulley 61 rotates by a predetermined amount. Wire 34 is preferably looped for more than 360° around pulley wheel 61 and a pressure wheel (not shown) may press on the wire to ensure that it does not slip when it runs on the pulley wheel. Sensor 60 is preferably located along the associated wire 34 upstream from the elements such as 46 and 69 which induce tension in the wire as described below.

Figure 8:
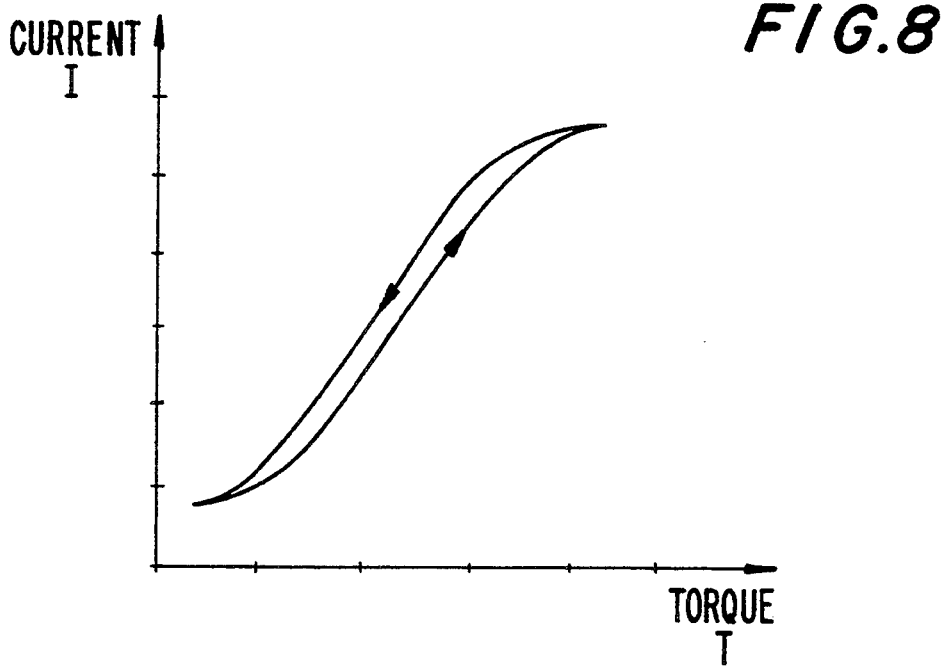
FIG. 8 is an illustrative current versus torque graph for a hysteresis brake which can be used according to the principles of this invention.

Following sensor 60 wire 34 passes to tensioning device 46. Tensioning device 46 includes a pulley wheel 64 about which wire 34 is again preferably wound for more than 360°. Pulley wheel 64 has a central shaft mounted on supports of the machine frame (not shown) for rotation about axis 65. The central shaft of pulley wheel 64 is rigidly connected to the input shaft of a hysteresis brake 66, which is capable of supplying variable drag torque on pulley wheel 64 when the latter is turned in direction 67 to supply wire to flyer 30. Variable drag on brake 66 can be achieved, when required in a certain instance, by supplying specific and defined values of electric current to its coils. FIG. 8 shows a typical performance curve for the hysteresis brake where current I is plotted against braking torque T. Brakes of this type are commercially available from Magtrol, Inc. of Buffalo, N.Y. Alternatively, tensioning devices of the type shown in commonly assigned, copending application Ser. No. 07/875,389 (incorporated by reference herein), now U.S. Pat. No. 5,310,124 can be employed if desired.

After tensioning device 46, wire 34 runs over a pulley wheel 68 of a spring biased dancer arm 69 prior to reaching flyer 30.

In prior art winders the hysteresis brake or other tensioning device 46 is used to develop a wire tension for guaranteeing that the coils are sufficiently compact and for maintaining control of the wire being drawn by rotation of the flyer. The dancer arm is particularly required during the operations which occur between windings of coils (e.g., during performance of the steps required to connect wire leads to the commutator). During these operations the flyer undergoes abrupt changes in rotation direction and also in speed. In these situations the dancer arm accommodates any abrupt tightening or loosening of the wire that may occur by resiliently pivoting about axle 70 in the appropriate direction 71.

According to the invention, brakes 66 and 66' and dancer arms 69 and 69' are preferably set prior to winding so that they should function according to the tension conditions which have been shown to achieve ideal coil formation. Then, during winding, with wires 34 and 35 travelling through respective sensing devices 60 and 60' the respective consumptions Q1 and Q2 of the wires being drawn from the spools are measured. By comparing the two consumptions (which may be either periodically measured rates of travel of the wires toward their respective flyers, or amounts of wire consumed since some predetermined starting time such as the beginning of winding of the pair of coils currently being wound) the difference in elongation and therefore the difference in tension occurring in the two wires is determined. On the basis of this comparison of consumptions, the torque in brakes 66 and 66' is adjusted to reduce the consumption difference to a minimum so that the consumptions of wire by both flyers 30 and 31 become substantially equal. For example, if the consumption of wire 34 measured by sensing device 60 becomes greater than the consumption of wire 35 measured by sensing device 60' it will generally be desired to increase the braking effort of tensioning device 66 relative to the braking effort of tensioning device 66'. It will be understood that this can be accomplished either by an absolute increase in the braking effort of tensioning device 66, or by an absolute decrease in the braking effort of tensioning device 66', or by a combination of these two absolute changes. The objective and result of such changes in braking effort is to reduce and ultimately substantially eliminate the difference between the consumptions of wires 34 and 35. This also typically has the effect of at least eventually reducing tension differences between the two wires. The foregoing procedures tend to reduce differences which would exist in the two coil masses being wound, and also tend to produce similar compactness in the opposite coils. As has been described above, this contributes to reducing unbalance in opposite coil receiving slot pairs of the armature.

A more specific approach which follows the foregoing principles is to initially set the ideal tension conditions for both of the flyers prior to winding and to use sensing devices 60 and 60' to measure the wire consumptions during winding. These measurements are related to the same time base and are periodically compared. Depending on the difference between the consumptions being compared, the torque in only one of brakes 66 and 66' is modified to reduce the existing inherent difference in wire elongation. Therefore, similarly to what has already been described, differences in mass and mass disposition between opposite coils of the armature can be substantially prevented or at least reduced. The embodiment described in this paragraph can be thought of as one in which one of the flyers, together with its respective tensioner, acts as a "master" to wind according to preset ideal tension conditions, while the other flyer, together with its respective tensioner, acts as a "slave" and tries to follow the wire consumption of the "master" in order to reduce differences in the winding conditions.

Figure 9:
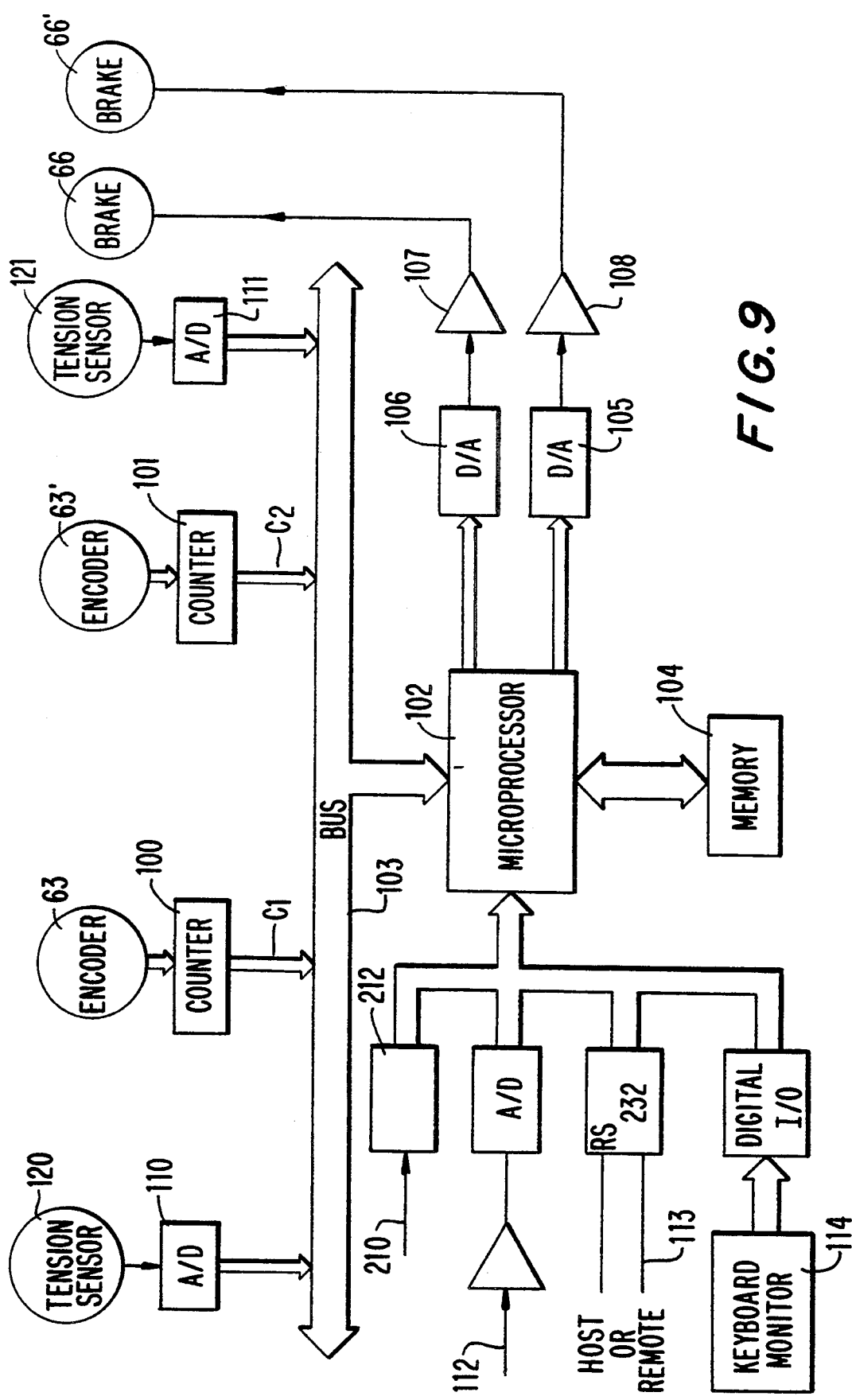
FIG. 9 is a block diagram representative of controls suitable for controlling the apparatus of FIGS. 6 and 7 (or alternatively the apparatus of FIG. 11) in accordance with the principles of the invention.

FIG. 9 is a schematic block diagram of an illustrative embodiment of a control system which can be connected to the apparatus shown in FIGS. 6 and 7 in order to control that apparatus as described above. Encoder counters 100, 101 are provided for counting the digital signals coming from their respective incremental encoders 63, 63'. This information, which corresponds to the quantities of wire passing through sensing devices 60 and 60' is supplied to microprocessor 102 via bus 103.

Memory 104 contains the program for causing microprocessor 102 to execute the control principles described above and further described below.

Digital to analog converters 105, 106 convert the digital control output signals produced by microprocessor 102 to the analog form typically required by brakes 66 and 66' in order to modify the torque they apply and therefore to modify the tension of the wires. Prior to being supplied to the brakes, these signals are amplified by amplifiers 107, 108.

Line 112 can be used for inputting ideal wire tensions, e.g., using potentiometers that supply analog signals which are transformed to digital signals for microprocessor 102.

Line 113 can be a serial line coming from a host or remote controller which can be the winder's ultimate controller so that when setting the winder for a particular type of armature, the ideal tension is automatically transferred to microprocessor 102 without requiring any further local input. Keyboard and monitor 114 are alternative input devices which an operator can use to supply the required tension conditions.

Wire tension sensors 120 and 121 can be provided to supply wire tension measurement signals to microprocessor 102 via respective analog to digital converters 110, 111 and bus 103. These wire tension measurement signals can be used by the microprocessor in a way which will be more fully described in subsequent paragraphs.

Figure 10:
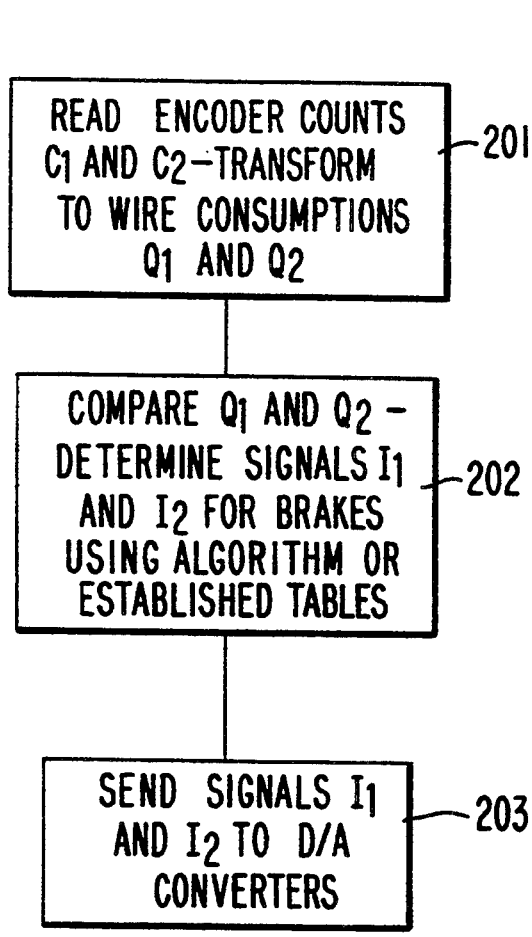
FIG. 10 is a flow chart showing certain steps that may be carried out by the apparatus of FIG. 9.

FIG. 10 shows certain control steps carried out periodically by microprocessor 102. For example, these steps may be performed each time a predetermined time interval has passed, or the performance of these steps may be synchronized with the occurrence of predetermined amounts of rotation of flyers 30 and 31. For the latter case, input 210 (e.g., from one of the flyer drives in FIG. 7) indicative of flyer rotation or angular position may be supplied to microprocessor 102 via a suitable interface device 212. In step 201 the counts C1 and C2 registered by counters 100 and 101 are used by microprocessor 102 to determine wire consumption data. This can be done in any of several ways. For example, the rates at which wires 34 and 35 are currently being consumed can be determined by subtracting from the current counts C1 and C2 the counts detected the last time step 201 was performed. (Alternatively, the subtraction operations can be eliminated if counters 100 and 101 are reset after each performance of step 201.) These consumption rates can be used as the current wire consumption values Q1 and Q2. Another example of how consumptions Q1 and Q2 can be determined is to use counts C1 and C2 without subtracting previous count values or resetting the counters after each reading. In this case counts C1 and C2 (and therefore consumption values Q1 and Q2) reflect relatively long-term time integrals of the quantities of wires 34 and 35 consumed. (It will probably be desired in this case to reset counters 100 and 101 before starting to wind each new pair of coils.)

In step 202 the wire consumptions Q1 and Q2 are compared to determine the difference in tensions which must be applied to the wires. In particular, in step 202 and step 203, by using algorithms or tables found by experience and dependent on the type of armature being wound, digital signals are determined by microprocessor 102 and supplied to converters 105 and 106 for correcting the torque in brakes 66 and 66' so that the difference between Q1 and Q2 become minimized.

In the context which has been described, for extremely fine tension regulation of the wires, brakes 66 and 66' can additionally or alternatively be controlled on the basis of feedback from optional wire tension sensors 120 and 121. As shown in FIG. 7, tension sensors 120 and 121 are preferably located downstream of tension producing elements such as 66 and 69, although upstream of flyers such as 30.

Figure 11:
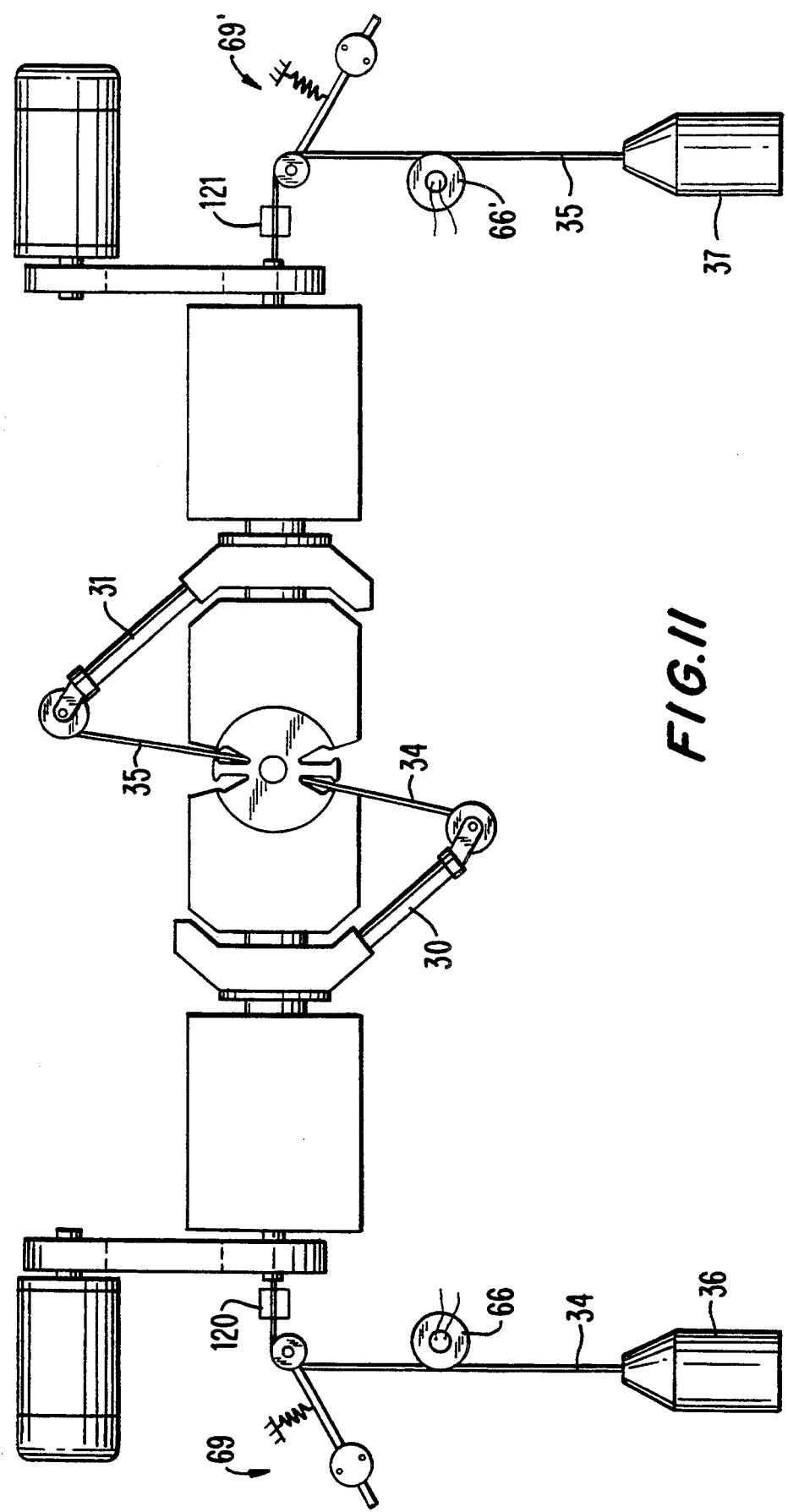
FIG. 11 is a view similar to FIG. 7 showing an alternative embodiment of the invention.

Although the above-described preferred embodiment of the invention employs sensing devices 60 and 60' to determine wire consumptions which are inherently a determination of wire elongation, it is possible to acquire an indication of this second quantity by measuring the tension of the wire in a position which is as near as possible to where the wire becomes deposited in the armature. This is true because the wire, starting from its wire supply spool 36 or 37, is subjected to a series of cumulative tension variations up until it is deposited in the armature. Such tension variations are due to the torque exerted by the associated hysteresis brake, the wire deformation over the various pulleys, the biasing action of the associated dancer arm, the frictional contact encountered by the wire along its travel path, and the centrifugal force together with other dynamic forces developed by the flyer rotation during winding. FIG. 11 therefore shows an alternative embodiment of the invention in which the measurements of wire tension sensors 120 and 121, instead of wire consumption sensors, are used as an indication of wire elongation. In this embodiment microprocessor 102 uses the output signals of sensors 120 and 121 to control brakes 66 and 66' to ensure that both wires always have substantially the same tension. This in turn should substantially equalize the two wire consumptions. The apparatus shown in FIG. 11 can be controlled by apparatus like that shown in FIG. 9, deleting elements such as 63, 63', 100, and 101 that are not required for the embodiment of FIG. 11.

It will be understood that the foregoing is merely illustrative of the principles of this invention, and that various modifications can be made by those skilled in the art without departing from the scope and spirit of the invention. For example, although the invention has been illustrated in the context of flyer type winders, the invention is equally applicable to winders having other types of wire dispensing members such as those shown in above-mentioned applications Ser. Nos. 07/738,199 and 07/742,629. Similarly, although hysteresis brakes 66 and 66' are shown herein as the principal tension inducing components, other types of wire tensioners (e.g., those shown in above-mentioned U.S. Pat. No. 5,310,124) are known and can be employed if desired.

The invention claimed is:

1. Apparatus for simultaneously winding two coils of wire on a rotor for use in a dynamo-electric machine comprising:

first and second wire supplies for respectively supplying first and second wires;

first and second winders for respectively winding said first and second wires on said rotor;

first and second means for respectively guiding said first and second wires to said first and second winders, said first and second means for guiding respectively comprising first and second means for monitoring consumptions of the respective one of said first and second wires which is passing through the respective one of said first and second means for guiding, and first and second means for applying tension to the respective one of said first and second wires which is passing through the respective one of said first and second means for guiding to the respective one of said first and second winders; and means responsive to said first and second means for monitoring for adjusting the tension applied by at least one of said first and second means for applying tension in order to substantially equalize the consumptions of said first and second wires.

2. The apparatus defined in claim 1 wherein the means for monitoring in each of said means for guiding is upstream from the means for applying tension in that means for guiding along the wire passing through that means for guiding.

3. The apparatus defined in claim 2 wherein said first and second means for monitoring respectively comprise:

first and second rotable members respectively in contact with said first and second wires so that each of said first and second members rotates at a rate indicative of the rate at which the wire in contact with it is passing through the respective one of said first and second means for guiding; and first and second digital encoding means respectively associated with said first and second rotatable members so that each of said first and second encoding means produces an output signal pulse each time the associated rotatable member rotates by a predetermined amount.

4. The apparatus defined in claim 3 wherein said means for adjusting comprises:

means responsive to the output signal pulses produced by said first and second digital encoding means for detecting any difference between the numbers of output signal pulses produced by said first and second digital encoding means.

5. The apparatus defined in claim 4 wherein, when said means for detecting detects a difference between the numbers of output signal pulses produced by said first and second digital encoding means, said means for detecting identifies which of said first and second digital encoding means has produced more of said output signal pulses, and wherein said means for adjusting further comprises:

means for producing a relative increase in the tension of the wire associated with the digital encoding means that has produced more of said output signal pulses.

6. Apparatus for simultaneously winding two coils of wire on a rotor for use in a dynamo-electric machine comprising:

first and second wire supplies for respectively supplying first and second wires;

first and second winders for respectively winding said first and second wires on said rotor;

first and second means for respectively guiding said first and second wires to said first and second winders, said first and second means for guiding respectively comprising first and second means for applying tension to the respective one of said first and second wires which is passing through the respective one of said first and second means for guiding to the respective one of said first and second winders, and first and second means for monitoring the tension of the respective one of said first and second wires passing through the respective one of said first and second means for guiding to the respective one of said first and second winders; and means responsive to said first and second means for monitoring for adjusting the tension applied by at least one of said first and second means for applying tension in order to substantially equalize the tension monitored by said first and second means of monitoring.

7. The apparatus defined in claim 6 wherein said means for applying tension in each of said means for guiding is upstream from the means for monitoring tension in that means for guiding along the wire passing through that means for guiding.

8. A method for simultaneously winding two coils of wire on a rotor for use in a dynamo-electric machine, each of said coils being wound by a respective one of first and second winders respectively supplied by first and second wires from first and second wire supplies, said method comprising the steps of:

monitoring the consumption of each of said first and second wires passing from the respective one of said first and second wire supplies to the respective one of said first and second winders; and applying tension to at least one of said first and second wires in response to the consumptions of said first and second wires to substantially equalize the consumptions of said first and second wires passing from the respective one of said first and second wire supplies to the respective one of said first and second winders.

9. A method for simultaneously winding two coils of wire on a rotor for use in a dynamo-electric machine, each of said coils being wound by a respective one of first and second winders respectively supplied by first and second wires from first and second wire supplies, said method comprising the steps of:

applying tension to each of said first and second wires passing from the respective one of said first and second wire supplies to the respective one of said first and second winders;

monitoring the tension of each of said first and second wires passing from the respective one of said first and second wires supplies to the respective one of said first and second winders; and adjusting the tension applied to at least one of said first and second wires in said applying step in response to the tension of said first and second wires in order to substantially equalize the tension of said first and second wires monitored in said monitoring step.

* * * * *